United States Patent

Richardson

[11] 3,896,377
[45] July 22, 1975

[54] PRINTING PRESS INSTRUMENTATION

[75] Inventor: James Ivor Richardson, Montville, N.J.

[73] Assignee: Harris-Intertype Corporation, Cleveland, Ohio

[22] Filed: Jan. 2, 1974

[21] Appl. No.: 430,196

[52] U.S. Cl........ 324/161; 235/95 DN; 235/95 MP; 324/178; 101/181
[51] Int. Cl.................... G06m 3/02; G01p 3/12
[58] Field of Search........ 101/181, 248; 226/27, 29, 226/30; 250/548, 557, 571, 231 SE, 233; 340/259, 263, 268; 318/327, 675, 640; 324/161, 178, 183, 175, 179; 235/92 DN, 92 MP, 92 T, 92 V, 92 GC

[56] References Cited
UNITED STATES PATENTS

| 3,594,552 | 7/1971 | Adamson | 101/181 |
| 3,812,351 | 5/1974 | Coberley | 235/92 MP |
| 3,816,712 | 6/1974 | Herzog | 235/92 MP |

FOREIGN PATENTS OR APPLICATIONS

| 1,097,528 | 1/1968 | United Kingdom | 324/175 |
| 1,932,609 | 11/1970 | Germany | 324/175 |

OTHER PUBLICATIONS
J. M. Shulman–Accurate Tachometry Methods with Electronic Counters–A.I.E.E. Transactions–V. 73, Pt. 1–Nov. 1954–pp. 452–455.

Primary Examiner—Alfred E. Smith
Assistant Examiner—Rolf Hille

[57] ABSTRACT

A digital electronic instrument for use with a printing press measures peripheral velocity of a roll of the press and relative angular position of one roll with respect to another. A series of white targets on a black background mounted on the periphery of a first roll are illuminated, and reflected light is sensed by a first light sensor to provide gating signals, which block and unblock the flow of a train of short pulses into a digital counter. When the peripheral velocity of the first roll is to be measured, the train of short pulses is provided by a clock pulse generator, and the number of short pulses counted by the counter while a white target passes under the light sensor provides a measure related to the peripheral speed of the first roll. When the relative position of a second roll with respect to the first roll is to be measured, the train of short pulses is provided instead by a second light sensor which senses the passage of alternate black and white lines of a grid pattern mounted on the periphery of the second roll. The leading edge of a white target on the first roll unblocks the flow of pulses to the counter from the grid of the second roll. The pulses generated by the grid terminate when the end of the grid pattern arrives at the second light sensor. The count received by the counter in one passage of a grid pattern indicates the relative angular positions of the two rolls.

22 Claims, 7 Drawing Figures

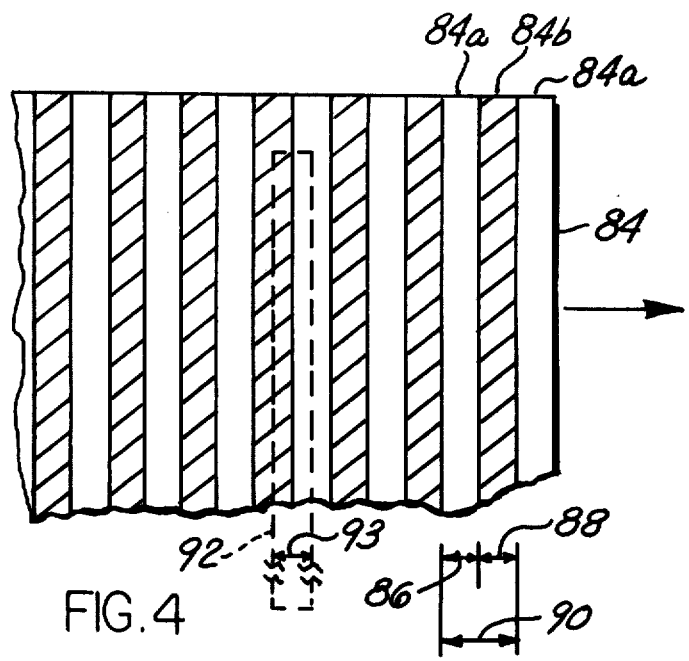
FIG. 4
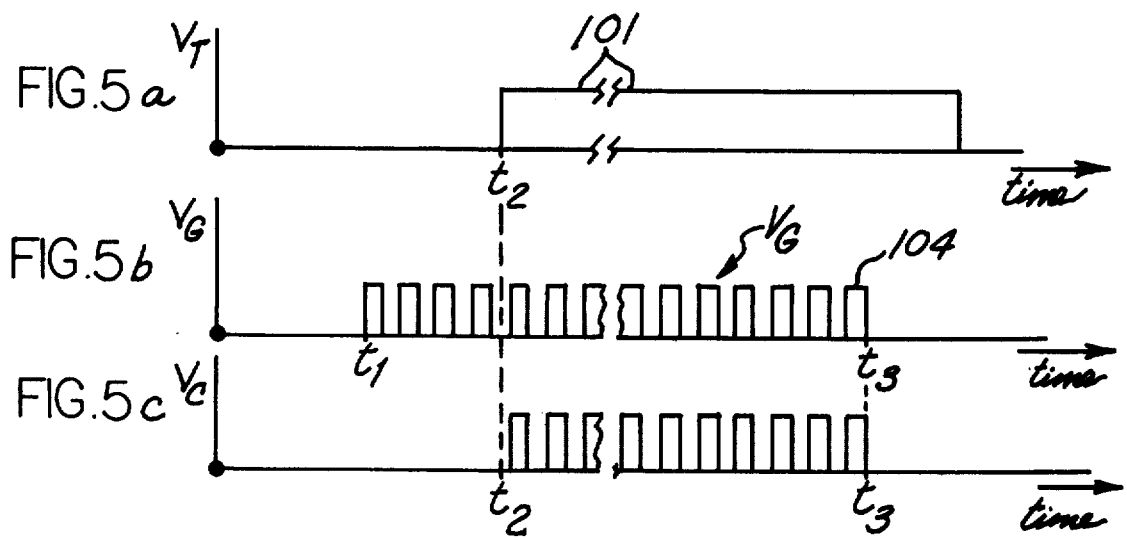
FIG. 5a
FIG. 5b
FIG. 5c

PRINTING PRESS INSTRUMENTATION

BACKGROUND OF THE INVENTION

Printing presses require extreme registration accuracy compared with other heavy machinery. In offset color printing presses that print on a continuous web, several colors of ink are printed in succession by each printing unit on the same area of web. The printing units, each of which may print a different color of ink, are driven by gear trains from a common drive shaft. If various color images are not printed in correct registration the picture is not sharp and clear.

In addition to defects in printing due to incorrect registration, a second defect called "doubling" often occurs, which can best be described by an example. If a first offset printing unit is printing yellow ink onto a continuous web and a second printing unit is printing blue ink onto the same web, the yellow ink printed by the first printing unit is ordinarily not completely dry when it arrives at the second unit and some of the yellow ink from the web transfers onto the blanket roll of the second or blue printing unit. One revolution of the blue blanket roll later, some of this yellow ink is redeposited on the web. Ideally, the redeposited yellow ink dot would be deposited exactly on top of the corresponding yellow ink dot of the subsequently printed impression on the web. However, due to many factors, of which dynamic variations in the gear train can be extremely important, the redeposited yellow dot may be placed slightly ahead of or behind the corresponding dot of the next impression. When this happens, a larger area of the web receives the yellow color than should receive it, producing a stronger yellow hue and greater yellow area than is desired. Because the "doubling" phenomenon is continually changing from impression to impression, it cannot always be eliminated by compensating adjustments. In commercial printing, a double of 0.005 inch is usually unacceptable.

Angular variations between the plate and blanket cylinders of the same printing unit can also produce a double, sometimes called a "self-double," which is not reduced by web elasticity as is the unit-to-unit double described above, but self-double is usually smaller than unit-to-unit double. In some situations, doubling has required commercial web offset presses to be operated considerably below their otherwise achievable design speeds.

Peripheral velocity sensing systems for accurately measuring the speeds of the rolls of printing presses, and angular position measuring systems for accurately measuring, especially, the relative angular positions between rolls of the same and of different printing units, are therefore very useful. They can provide information that indicates the amount of doubling of the final printed product, and can be employed for display and recording during the printing process, as well as for adjusting automatic controls that are responsive to the measured peripheral velocities and angular positions of the rolls.

SUMMARY OF THE INVENTION

In the present invention, light sensors and digital electronic techniques are employed to measure the lineal velocity of the cylindrical surface of a rotating member such as a roll of a printing press, and also for measuring the relative positions of two rolls which may be on the same printing unit or on different printing units. A series of light-reflecting targets of equal and known lengths are attached to the periphery of a roll. A lamp illuminates the targets as they pass beneath a first light sensor, whose electrical output is proportional to the amount of light sensed. A high-frequency digital clock is provided for measuring the elapsed time during passage of a target beneath the sensor, by counting the number of pulses produced by the clock during the passage. A fixed count is subtracted from the total count obtained to suppress the zero so as to magnify the variations of the remaining count, and the remaining count is converted to a voltage and recorded on a strip chart to indicate a quantity related to the average velocity during one target passage. The counting is repeated for each target passage to produce a quasi-continuous time trace related to velocity. A single pulse is also produced once per revolution of the roll, and displayed on the strip chart on a second channel to facilitate target identification among the plurality of targets on the periphery of the roll. The foregoing is a description of the velocity-sensing mode of operation.

The same targets, light sensor, and signal conditioning circuits described above are employed to measure angular position of the first roll having the white targets with respect to a second roll of the printing press. On the second roll, a plurality of groups of black and white grid lines are attached, and a second light sensor is provided for sensing the grid lines as they pass in succession under the second light sensor during rotation. When relative angular position of two rolls is being measured, the train of pulses from the clock pulse generator described above is replaced by a train of pulses produced by the grid and the second light sensor, associated with the second roll. The pulses from the grid start before the leading edge of a target signal from the first roll and terminate before the trailing edge of the target signal from the first roll. The signal from the first roll gates the pulse train of the second roll on, to admit the pulses of the second roll to the counter. When the end of the grid-generated pulse train is reached, the contents of the counter is a number dependent upon the relative angular position of the leading edge of the target of the first roll and a trailing edge of the grid pattern of the second roll, and hence is a measure of the relative angular position of the two rolls. The count from the counter is converted to a voltage and displayed on a strip chart.

The press instrumentation therefore records data related to the absolute velocity of one roll, and the relative position of a second roll with respect to the first roll. In the velocity mode, the instrumentation measures the time for passage of a fixed length on the periphery of a roll, and therefore, upon proper processing of the data, measures lineal velocity. Because a fixed count is subtracted from the results of a velocity measurement before the measurement is recorded, the velocity measurement can also be said to be a measurement of the relative velocity of the first roll with respect to an imaginary roll operating at constant speed. The resulting recorded data are suitable for later analyzing the operation of the printing press or for use in manually or automatically making corrective adjustments of the printing press in real time.

Accordingly, one object of the present invention is to provide instrumentation for accurate measurement of the dynamic behavior of a printing press.

Another object is to provide instrumentation for measuring the lineal velocity of the periphery of a rotating member of printing press either absolutely or with respect to an idealized uniformly rotating member.

A further object is to provide instrumentation for measuring the angular position of a rotating member of a printing press with respect to that of a second rotating member of the press.

Still another object is to provide a velocity and position measuring system that does not mechanically touch the rotating members whose velocity and position it measures.

A further object is to provide instrumentation for digitally measuring the velocity or position of a rotating member of the printing press.

Another object is to provide a visual display and record of the velocity or position of a rotating member of a printing press with respect to either an absolute reference or another rotating member.

A further object is to provide a press instrumentation system in which signals resulting from light reflected from a target on one roll of the printing press block and unblock a train of pulses resulting from a grid on the surface of a second roll of the printing press, and in which a digital counter counts the pulses of the pulse train that are unblocked to produce a count indicative of relative angular position of the two rolls.

A further object is to provide press instrumentation as above and in which the resulting data are recorded sequentially in time.

DESCRIPTION OF DRAWINGS

Other objects and features of the invention will become apparent upon consideration of the description which follows and of the drawings in which:

FIG. 4 shows a portion of a light-reflective grid target suitable for mounting on the periphery of a second roll of the printing press, and shows also the field of view defined by an aperture of an associated optical system.

FIGS. 5a, 5b, and 5c show voltage waveforms related to the block target, the grid target, and the counter of FIG. 3, respectively.

DESCRIPTION OF A PREFERRED EMBODIMENT

Figure 1:
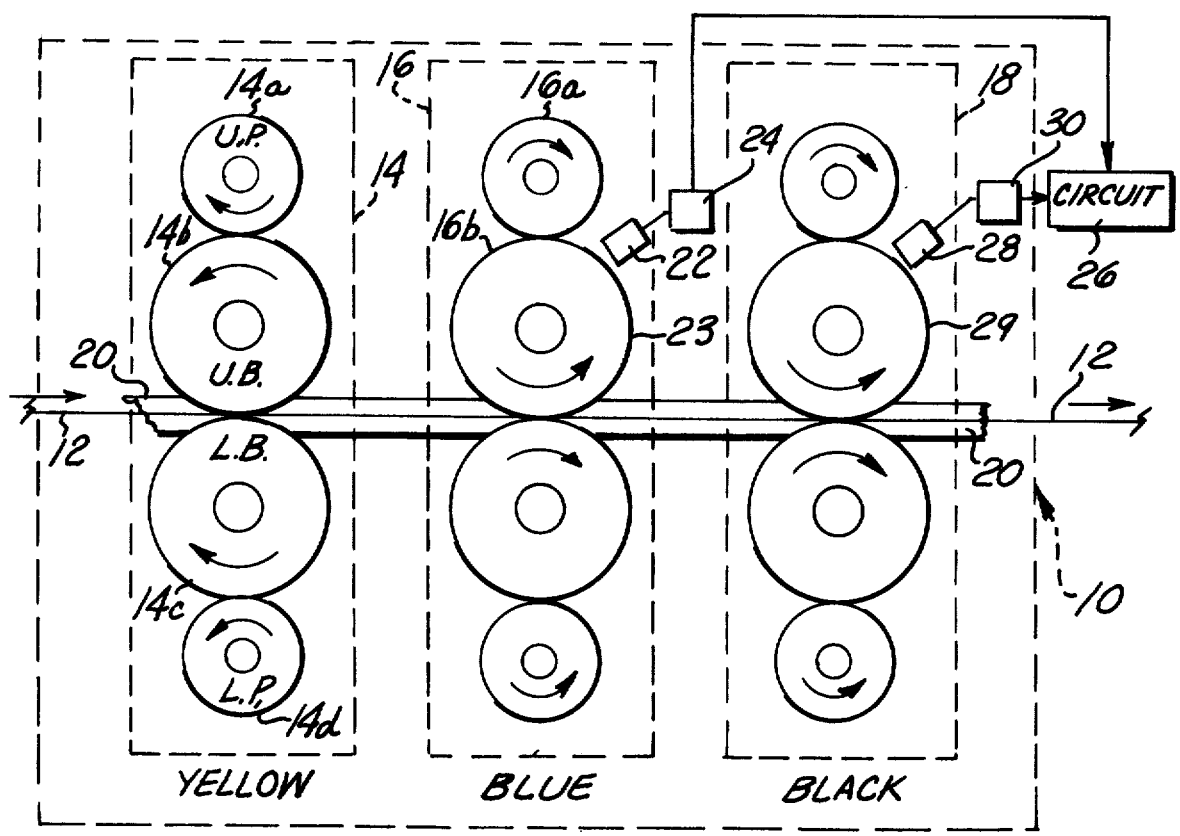
FIG. 1 shows a three-color offset lithographic web-fed perfecting printing press that is instrumented with the invention.

A preferred embodiment of the invention, adapted for measuring velocities and positions of rolls of a three-color printing press, is shown in FIG. 1. The printing press 10 receives a moving web 12 of paper or other continuous material at a first printing unit 14, which prints yellow ink images on both sides of the web. The web 12 proceeds through a second printing unit 16, which prints blue ink images on both sides of the web, and a third printing unit 18 which prints black ink images on both sides of the web. The yellow printing unit 14 includes an upper plate cylinder 14a, which accepts ink only on portions of its peripheral surface which correspond to portions of a yellow image to be printed, an upper blanket cylinder 14b which transfers the yellow ink from the upper plate cylinder 14a to the upper side of the web 12, and lower blanket and lower plate cylinders 14c, 14d which perform similar functions for printing yellow ink on the underside of the web 12. The other printing units 16, 18 are similarly equipped with rolls.

The printing units 14, 16, 18 are driven by gear trains from a common drive shaft 20 in a manner that is well known in the prior art. The blue printing unit 16 is provided with a light-sensing device 22 which receives reflected light signals from a strip 23 of rectangular white block-shaped targets affixed to the surface of the upper blanket cylinder or roll 16b. Electrical signals from the light-sensing device 22 are processed by a signal-conditioning unit 24 located at the printing unit 16. A cable transmits output signals from the signal-conditioning unit 24 to electronic circuitry 26, which combines the pulse signals produced by the light sensor 22 with other shorter pulse signals, to produce velocity or relative position data, as will be described in more detail hereinafter. The electronic circuitry 26 includes a strip chart recorder for displaying the results of the measurements.

The black printing unit 18 has an upper blanket cylinder 18b upon whose periphery a grid pattern 29 of black and white lines is affixed at a strip where it will not interfere with the image to be printed by the printing press, the alternating black and white lines of the grid pattern 29 being parallel to the principal axis of the roll 18b. A light sensor 28 detects the passage of alternate black and white grid lines to produce electrical pulses that are conducted to a signal-conditioning unit 30 located at the black printing unit 18. The light sensor 28 and the signal-conditioning unit 30 are identical to the light sensor 22 and signal conditioning unit 24 of the blue printing unit 16, although the signals being processed differ somewhat between the two printing units. Conditioned pulse signals corresponding to the grid pattern are transmitted from the unit 30 on a cable to the electronic circuitry 26, where they are employed for producing a display of relative position of the black unit blanket cylinder 18b with respect to the blue unit blanket cylinder 16b.

Thus, the printing press 10 prints images in three colors on both sides of a moving continuous web 12, and optical instrumentation 22, 23, 28, 29 produces electronic pulse signals which are processed by electronic equipment 24, 26, 30 to produce indications and records related to the velocity of the periphery of a blanket roll 16b, and of the relative positions of the blanket rolls 16b and 18b.

Figure 2:
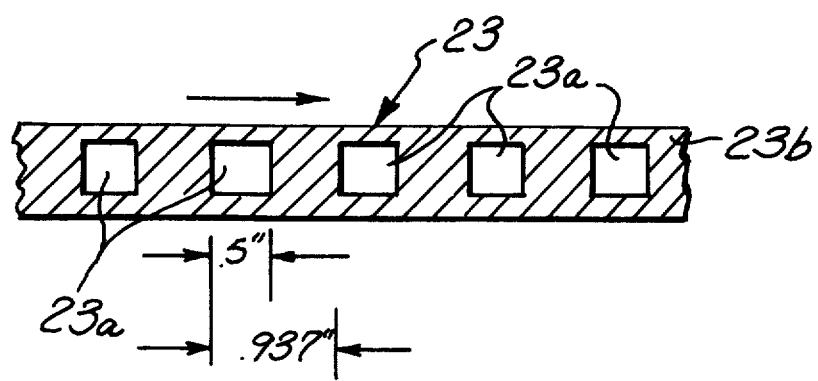
FIG. 2 shows a strip of light-reflective block targets for mounting on the periphery of a roll of the printing press of FIG. 1.
Figure 3:
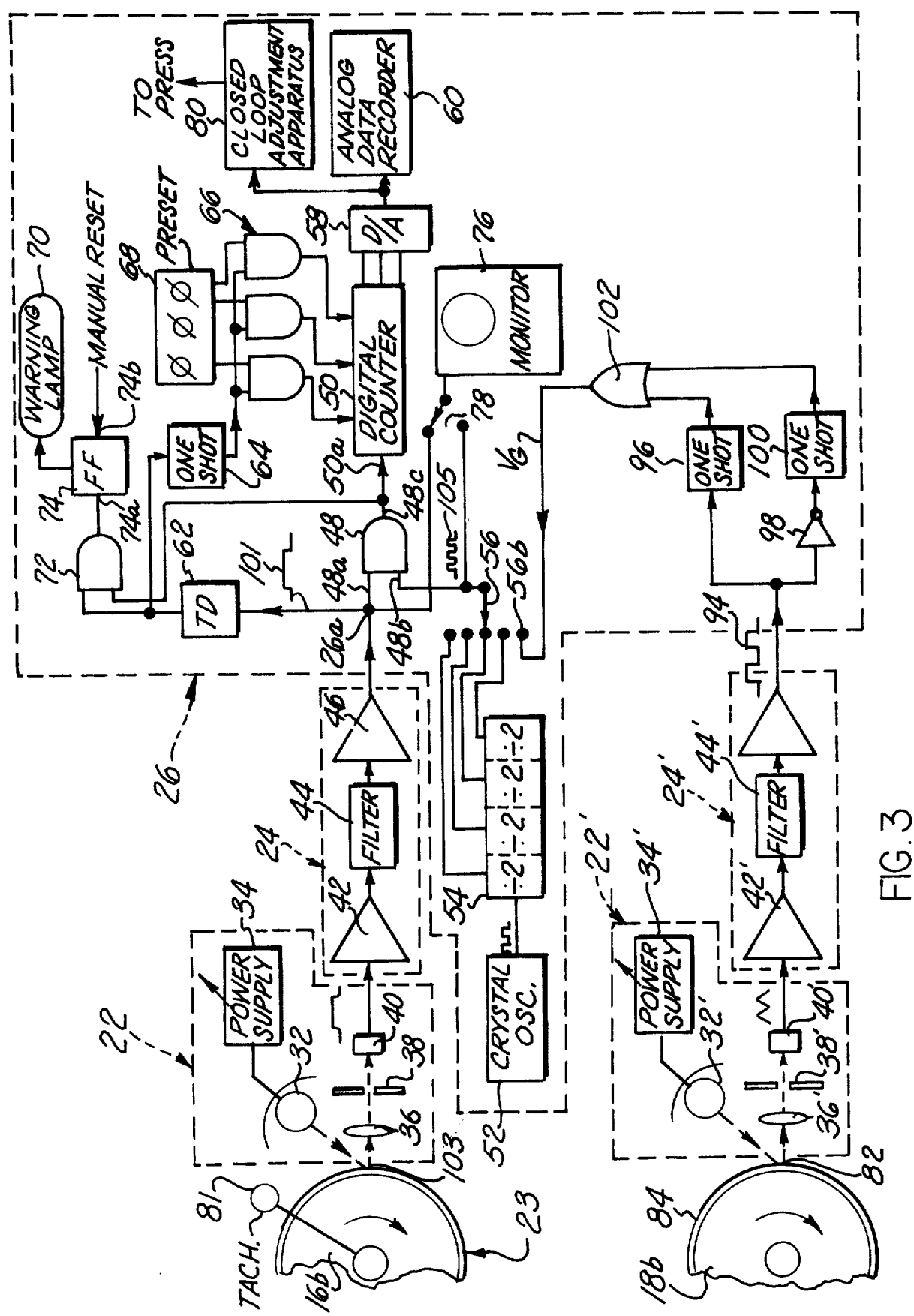
FIG. 3 is a system block diagram of a preferred embodiment of the invention.

The system can be understood more completely by reference to FIGS. 2 and 3. The purpose of the target strip 23, the optical sensor 22, and the signal conditioning unit 24 is to produce pulses whose duration depends upon the lineal speed of the periphery of the roll 16b. The technique employed is to produce pulses whose duration equals the time required for a white target 23a of precisely known length to pass a fixed point 103 as the roll 16b rotates. A lamp illuminates the targets on the upper blanket roll of the blue printing unit and the block-shaped targets 23a reflect light into the optical sensor 22 to produce electrical pulses that are amplified and shaped by the conditioning circuit 24. In a preferred embodiment, the strip 23 of square targets 23a, which is shown in FIG. 2, is illuminated by a reflector-type lamp 32 that is energized by an adjustablevoltage power source 34, as shown in FIG. 3. In the preferred embodiment, the illumination angle is 45° and a spot is illuminated on the target strip 23 of FIG. 2. The target strip 23 is a photographically-prepared long strip of matte-surface film containing a series of white rectangular blocks 23a surrounded by a black background 23b. The length of each patch is preferably 0.500 inch, with a length tolerance of less than 0.0005 inch, which is 0.1%. All of the targets 23a are the same length. A single strip of targets is attached to the periphery of the upper blanket cylinder 16b with a double-sided pressure-sensitive tape, and it preferably encompasses the entire circumference of the cylinder 16b. As the cylinder 16b rotates, the targets 23a successively pass into and out of a field of view of the light sensor 22. The sensor 22 includes, in addition to the light source, an object lens 36, a rack and pinion for focusing the device, an aperture slit 38, and a photosensitive element 40. The design of the optical sensor 22 for performing the present functions is well within the skill of those familiar with the prior art. The lens 36 is focused to produce an image of the target 23 in the plane of the aperture slit 38. The slit 38 is oriented parallel to leading and trailing edges of the targets 23a so as to provide a maximum rate of change of a light signal received by the sensor 22 as a target 23a enters and leaves the field of view defined by the aperture slit 38. The photosensitive element 40 in the preferred embodiment is a combined detector and amplifier assembly having a PIN silicon photodiode acting as a light-controlled current source for driving an operational amplifier which is mounted integrally with the photosensitive element 40.

The photosensitive element 40 and its amplifier are sensitive to signal frequencies up to about 10 megahertz, to accommodate light signals from the targets described herein moving at lineal speeds as high as 2500 feet per minute. The light sensor 22 produces electrical signals proportional to the intensity of the received light, which vary cyclically as the targets 23a and the background area 23b pass alternately beneath the sensor 22.

The electrical pulses thus produced are amplified and conditioned by the signal conditioning circuit 24 whose components are shown in FIG. 3. The signal conditioning unit 24 includes a fixed gain amplifier 42, a band-pass filter 44, and a cable driver amplifier 46, also of fixed gain. Electrical pulses produced by the light sensor 22 are amplified by the amplifier 42, shaped by the band pass filter 44, and further amplified by the cable driver amplifier 46, which also serves as a limiter for squaring off the tops of the electrical pulses to a position 5 volt level.

The light sensor 22 and the signal conditioning unit 24 therefore produce 5 volt pulses 101 for application to a coaxial cable leading to the electronic circuitry 26, the pulses 101 starting when the leading edge of a white target 23a enters the field of view of the optical sensor 22 and terminating when the trailing edge of the white target 23 departs from the field of view of the light sensor 22. The duration of the pulses 101 at the output of the signal conditioning unit 24 is therefore a measure of the time required for a 0.5 inch length of the periphery of the roll 16b to pass the stationary point 103, and is therefore dependent upon the lineal speed of the periphery of the roll 16b. When the black background 23b is at the sensing point 103, the output voltage 101 of the signal conditioning unit 24 is zero. When a leading edge of a white target 23a arrives at the sensing point 103, the output voltage 101 of the signal conditioning unit 24 rises rapidly to positive 5 volts, and the voltage remains at that value until the trailing edge of the white target 23a passes the sensing point 103, at which time the voltage 101 decreases rapidly to zero. Because the velocity of the periphery is equal to the distance traveled divided by the time required for the travel, the velocity can be determined in reciprocal form by measuring the time required for the roll to travel a fixed distance, namely 0.5 inch.

The electronic circuitry 26 provides an indication of velocity of the roll 16b by measuring the duration of the pulses 101 from the signal conditioner 24, the duration being measured by counting the number of cycles of a crystal-controlled clock oscillator which occur during the pulse 101. The circuitry 26 also displays the results on a strip chart recorder. The principal of operation of the velocity measuring portion of the electronic circuitry 26 is that when a pulse 101 from the roll 16b is at its high level, a pulse gate 48 is in an open condition to permit shorter pulses to flow from a pulse generator 52, 54 within the circuitry 26 to a digital counter 50. Upon termination of the pulse 101 from the roll 16b, the contents of the counter 50 are recorded, after which the counter is reset in preparation for the next pulse from the roll 16b.

As shown in FIG. 3, pulses 101 from the signal conditioner 24, associated with the roll 16b and produced by the white target areas 23a, enter the circuit 26 at an input terminal 26a. The target pulses 101 are connected to a terminal 48a of the AND gate 48 to enable the AND gate to transmit short pulses 105 which are applied to its other input terminal 48b. When the signal 101 at terminal 48a is positive 5 volts, the train of clock pulses 105 at the input terminal 48b passes through the AND gate 48 to its output terminal 48c, from which the train of pulses 105 is connected to the pulse input terminal 50a of the digital counter 50 to be counted.

The train of pulses 105 at the terminal 48b is generated initially by a crystal oscillator 52, operating, in the preferred embodiment, at a frequency of 8 megahertz. A ripple counter 54 serves as a frequency divider to divide the frequency produced by the crystal oscillator 52, using four bistable multivibrators, i.e., flip-flop devices, that are connected in cascade. The trailing edge of each pulse from the crystal oscillator 52 changes the state of the first flip-flop, so that successive trailing edges of the crystal oscillator signal change the state of the first flip-flop from on to off, or vice versa, in a manner which is well known in the prior art. Each of the four frequency divider stages provides a separate output at frequencies respectively of 4 megahertz, 2 megahertz, 1 megahertz, and 0.5 megahertz. These four frequencies are made available for manual selection at a selector switch 56, so that one of them can provide the pulse train 105 to be counted by the digital counter 50 during the pulse signal 101; see FIG. 5a.

The final count achieved by the digital counter 50 at the end of the gating pulse 101 is converted to an analog voltage by a digital-to-analog converter, i.e., a D/A, 58, whose output is connected to a strip chart analog data recorder 60. The analog voltage that is recorded is inversely proportional to the average velocity of the roll 16b during the time of transit of a white target 23a past the sensing point 103.

In order to provide sufficient time for the D/A 58 to settle and for the recorder 60 to record a final count, the final count is permitted to remain in the digital counter 50 for an interval determined by a time delay circuit 62. This hold interval follows the trailing edge of the gating pulse 101, which initiates the time delay of circuit 62. Time delay circuits to perform the functions of circuit 62 are well known in the prior art. The time delay circuit 62 produces a pulse starting at the trailing edge of the gating pulse 101 and lasting for a fixed predetermined time determined by the device 62. The trailing edge of the hold pulse from the device 62 actuates a monostable, i.e., one-shot, multivibrator 64, which produces a gating pulse of sufficient duration to enable three data gates 66 to transmit a preset count from a preset base count register 68 into the digital counter 50 at the end of the final-count-holding time interval. The preset count register 68 can be manually preset to zero or, preferably, to some other number to which it is desired to preset the digital counter 50 before it starts receiving pulses in the next following gating pulse interval 101.

The use of a non-zero preset count for the digital counter 50, as entered by the preset base count register 68, corresponds to subtracting a fixed time from the measured duration of the gating pulse 101, because the digital counter 50 recycles upon reaching a full count, and the preset base count corresponds to a subtraction from the duration of gating pulse 101. As a result, the data recorder 60 can, if desired, record to a magnified scale the variations of the time of passage of the targets 23a in a suppressed zero mode of operation, and this is a preferred mode of operation. The time of passage of a target 23a is a fractional period of revolution of the cylinder 16b. When a preset base count is entered into the digital counter 50 prior to initiation of counting by the gating pulse 101, the data recorder 60 records the difference between the fractional period of rotation of the cylinder 16b and the fractional period of rotation of an imaginery cylinder which rotates always at a fixed velocity, as determined by the amount of the preset base count. Hence, the variations of speed of the cylinder 16b with respect to a uniformly rotating idealized cylinder taken as a reference are recorded.

Gating pulses 101 follow each other in succession from the targets 23a on the cylinder 16b, so that final digital counts are achieved and held successively in the digital counter 50a. The analog data recorder 60 successively records the final counts during the hold intervals that are established by the time-delay device 62.

A warning lamp 70 is provided to warn of a malfunction of the system if pulses are received at the input terminal 50a of the digital counter 50 during the hold intervals established by the time delay device 62. Any such pulse at the terminal 50a must be a spurious one. It is prevented from being counted by a gate, not shown, which blocks its passage to the digital counter 50. Upon occurrence of such a spurious pulse, an AND gate 72 passes the spurious pulse to a set terminal of a flip-flop 74 whose output drives the warning lamp 70. The flip-flop 74 latches in a set state upon occurrence of a spurious pulse, to maintain the warning lamp 70 lighted until such time as the flip-flop 74 is reset manually at a manual reset terminal 74b to indicate acknowledgement, by an operator, of the warning signal.

To facilitate adjustment, especially optical adjustment of the pulse-producing circuitry, a monitor oscilloscope 76 is provided whose vertical deflection input terminal may be selectively connected either to terminal 48a or terminal 48b of the gate 48 to observe and optimize adjustment of the pulse waveforms appearing there, a selector switch 78 being provided for selecting the input signal to be applied to the monitor 76.

A second output connection 80 is provided from the D/A 58 for use by an automatic closed loop control system for correctively adjusting the printing press in response to the readings of velocity or position produced at the output of the D/A 58.

The velocity recording portion of the electronic circuitry 26 is thus seen to measure the time of passage of the white target areas 23a past the stationary viewing point 103, by counting the pulses 105 produced by a constant-frequency oscillator 52, 54 during the passage of the target 23a as indicated by a gating pulse 101, and to convert the final count for each target 23a to an analog signal for recording on a strip chart recorder 60.

Ambiguities of reading, if any, can be resolved by a tachometer 81, which is mounted to measure the angular velocity of the cylinder 16b.

Relative position measurements between the cylinder 16b and the cylinder 18b are made by mounting a grid pattern on the cylinder 18b and substituting pulses produced by the grid pattern in place of pulses from the frequency divider 54. The gating pulses 101 produced by the targets 23a of cylinder 16b are used in a manner similar to that described above. The system can compare the relative angular positions of any two rotating members that are connected by a gear train in a one-to-one or other simple ratio. The relative position of the cylinder 18b with respect to the cylinder 16b is measured by measuring the relative position of optical patterns 84 mounted on the periphery of the cylinder 18b with respect to the position of optical patterns 23 mounted on the cylinder 16b, the relative positions of the patterns being determined by the times at which the patterns come into view at stationary optical viewing positions 103, 82 near the cylinders 16b and 18b respectively. Grid lines are arranged in groups 84 on the surface of the cylinder 18b, and in such positions that a group of grid lines has already partially passed the viewing position 82 of the cylinder 18b at the time that the leading edge of one of the white targets 23a arrives at the viewing position 103 near the cylinder 16b. The number of grid lines of the group 84 which remain before arrival of the end of the group, which occurs before the trailing edge of the corresponding white target 23a arrives at the viewing position 103, is counted to determine the relative positions of the cylinders 18b, 16b. The principal of operation is that the cylinder 16b is known to be in a particular position when the leading edge of a target 23a is at the viewing position 103 and it is desired to determine the position of the cylinder 18b at that same instant. The position of cylinder 18b at that instant is characterized by the fact that a particular line or space of a group 84 of grid lines on the cylinder 18d is at a stationary viewing position 82 at that particular instant. In order to determine which particular line or space is at the viewing position 82 at that instant, the number of lines and spaces of that group which remain between that particular line or space and the last line of the group of lines, is ascertained. The number of lines and spaces is ascertained by counting them in the counter 50.

The groups of grid patterns 84 on the cylinder 18b are illuminated and the light reflected from them is viewed by an optical system identical to that employed with cylinder 16b and whose signals are process by a signal conditioning circuit identical to that employed with the cylinder 16b. A power source 34' energizes a lamp 32' which casts an intense light upon targets 84 which are mounted by means of two-sided pressure sensitive tape on the surface of the cylinder 18b.

The patterns of the targets 84 are rectangular blocks of parallel grid lines, which occupy areas similar to the white grid areas 23a of FIG. 2, but which have alternating white and black lines 84a, 84b as shown in FIG. 4. FIG. 4 shows only one corner of one of the groups 84, the entire patch being too large to show on a figure which also shows details of the lines 84a, 84b. Each of the white lines 84a is 0.002 inch wide in a preferred embodiment, as indicated by the dimension 86 of FIG. 4, and each of the black lines 84b is also 0.002 inch wide as indicated by the dimensional line 88 of FIG. 4, to provide a total black and white cycle width of 0.004 inch, as indicated by the dimension line 90.

A lens 36' produces an image in a plane at which an aperture slit 38' is located, FIG. 3. The field of view 92 defined by the aperture slit 38' is indicated in FIG. 4 by dotted boundary lines, the width 93 of the field of view being 0.002 inch, so as to be equal to the width of a white line 84a or a black line 84b. As the cylinder 18b revolves, a triangular waveform of light intensity falls upon a photosensitive detector 40', which produces an electrical signal that is amplified by an amplifier 42', filtered by a bandpass filter 44', and amplified further by a limiting amplifer 46' to produce waves that are approximately square waves at the output of a signal-processing circuit 24'.

A rectangular waveform 94 produced by the pulse conditioning circuit 24' is conducted to the electronic circuitry 26 on a cable, which applies the signal 94 to a one-shot multivibrator 96 that generates a 150 nanosecond pulse starting at the trailing edge of each of the pulses of the waveform 94. The pulses 94 are inverted in an inverter 98 so that leading edges become trailing edges at the output of the inverter 98. The trailing edges of pulses from the inverter 98 actuate a second one-shot multivibrator 100 which produces a 150 nanosecond pulse for each such trailing edge. An OR gate 102 receives the pulses from both of the one-shot multivibrators 96, 100, which are produced at trailing and leading edges respectively of the original waveform 94, to produce a voltage signal $V_G$ at the output of the OR gate 102 having twice the frequency of the waveform 94. The waveform $V_G$ is shown in FIG. 5b.

When relative positions of the cylinders 18b, 16b are to be measured, the selector switch 56 is placed in a position 56b to select pulses $V_G$ for application to the input terminal 48b of the AND gate 48, instead of selecting pulses from the frequency divider 54 as was done for velocity measurements.

In a time-sequence of operation of the relative-position measuring system, the beginning of a grid group 84 arrives at the stationary viewing position 82 as the cylinder 18b rotates. This starts a pulse train $V_G$ of FIG. 5b as described hereinabove, at a time $t1$. At a later time $t2$, the leading edge of a target 23a on the cylinder 16b has rotated to the stationary viewing position 103, to produce the leading edge of a gating pulse 101 as shown in FIG. 5a and as described hereinabove in detail.

The digital counter 50, which has previously been either reset to zero or preset to a number that was manually registered in the count register 68, starts to count the pulses of the train $V_G$ after the time $t2$ because the AND gate 48 is then conditioned by the gating signal 101 to transmit pulses present at its terminal 48b to the digital counter 50.

As shown in FIG. 5b, the pulses of the train $V_G$ terminate at a still later time $t3$ when the trailing edge of a group 84 of white and black lines 84a, 84b, on the cylinder 18b is rotated to the viewing position 82. The trailing edge of the last white pulse 84a, which is the leading edge of the last black pulses 84b, produces the final multivibrator pulse 104 of the train $V_G$. The digital counter 50 by that time has increased its count by an amount equal to the number of pulses of the train $V_G$ occurring between the times $t2$ and $t3$ of FIG. 5b. The counts which enter the digital counter 50 during this interval are illustrated by the wave form $V_C$ in FIG. 5c.

The sequence of events described above is repeated many times while the cylinders 18b, 16b rotate once, because each of the targets 23a and groups 84 of grid lines produces a new final count in the digital counter 50. Thus, the data recorder 60 records a quasi-continuous history of the relative angular positions of the cylinder 16b, 18b.

As before, a preset may be entered into the digital counter 50 if desired for convenience in producing an expanded scale recording of small variation in angular position between the cylinder 16b, 18b. The use of a preset in the measurement of relative angular positions corresponds to changing the reference point to which a count is made. Instead of counting to the last line of a group 84 of lines of the grid, a line that is a predetermined number of lines ahead of that last line on the grid, terminates the counting.

To summarize the operation of the relative position measuring mode, the leading edge of a gating pulse produced by a rectangular target on the cylinder 16b admits pulses of a pulse train, which is generated by grid lines on the cylinder 18b and which is already under way, to a counter which counts the remaining pulses in the current group 84 of pulses. The resulting final count is converted to an analog voltage and recorded, to provide a record of relative angular positions of the two cylinders as of the time that the leading edge of a target on cylinder 16b arrives at the viewing position 103.

The system described above is seen to produce data indicative of the peripheral velocity of a rotating member of a printing press and of the relative angular positions between two rotating members of the printing press, and also of the relative velocity of one rotating member and an idealized uniformly rotating member.

The instrumentation just described is especially suitable for making measurements of the doubling phenomenon of printing. A small computer operated in conjunction with the experimental data produced by the instrumentation just described has produced a measure of doubling known as the "doubling index," which correlates very well with optical observations of the amount of doubling produced by the printing press.

This "doubling index" information and other such computer data, including derivatives of the velocity information, are adaptable for a data acquisition and data management program for use in a closed-loop control system for the printing press. A considerable amount of printing press fluctuation is periodic. Consequently, fluctuations of the near future can be anticipated from data regarding the near past, and disturbances can be deliberately introduced to compensate and therefore reduce the expected fluctuations. Thus an adaptive control feedback system can be provided that utilizes data from the instrumentation just described. The output 80, of which the computer may be a part, is provided for this purpose.

If it is desired to gather velocity data and relative position data simultaneously, a second counter may be provided, a few other components duplicated, in accordance with routine design techniques requiring only ordinary skill.

Numerous variations within the scope of the invention are possible. For example, signals from the group 84 of grid lines on the roll 18b could start after the leading edge of the pulse 101 of roll 16b, and the trailing edge of the pulse 101 could terminate the count.

What is claimed is:

1. In a printing press having at least two rotatable members, apparatus for making measurements regarding a first rotatable member comprising means for producing a first position-indicating signal when said first member arrives at a first predetermined position; first means for generating a first train of successive clock signals at equally spaced successive times; means for producing a second position-indicating signal when said first member arrives at a second predetermined position including means for ending said first train of signals thereupon; second means for generating a second train of successive signals upon the respective passage of equal successive increments of angular travel of a second rotatable member; means for ending said second train when said second member arrives at a predetermined position; means for selecting one of said first and second means of generating successive signals to provide selectively one of said first and second trains of signals; and means for counting the successive signals of said selected train occurring between said first position-indicating signal and the end of said selected train to produce a final count.

2. Measurement apparatus as defined in claim 1 and further comprising automatic adjustment means responsive to said final count to adjust the printing press to correct for an unsatisfactory final count.

3. Measurement apparatus as defined in claim 1 and further comprising means for performing a measurement to achieve a final count a plurality of times during one revolution of said first rotating member.

4. Measurement as defined in claim 1 and wherein said counting means comprises means for starting its count at a predetermined number, whereby said predetermined number is algebraically added to the count received to bias said final count.

5. Measurement apparatus as defined in claim 4 and wherein said counting means comprises means for recycling and starting over upon exceeding its maximum count capacity.

6. Measurement apparatus as defined in claim 1 and wherein said means for producing said first and second signals comprises optical sensor means for receiving light signals reflected from an optical target on a surface of said first rotating member.

7. Measurement apparatus as defined in claim 1 and further comprising means for recording said final count of said counting means.

8. Measurement apparatus as defined in claim 1 and in which each of said first and second means for producing position-indicating signals comprises first and second means for producing a change of signal level from one level to another level.

9. Measurement apparatus as defined in claim 31 and wherein each of said means for generating said first and second position-indicating signals comprises optical sensor means responsive to optical target positions on said first member.

10. In a printing press having at least two rotatable members, apparatus for making measurements regarding a first rotatable member relative to a second rotatable member comprising optical means for producing a first position-indicating signal when said first member arrives at a first predetermined position; a group of light-reflective targets equally spaced by angular units of travel throughout an angular portion less than 360° on a second rotatable member, said group ending at a preselected position; optical means at a stationary viewing station and viewing said group of targets for generating a train of successive signals upon equal respective successive ones of said angular units of travel of said second rotatable member; and means for counting the successive signals corresponding respectively to said targets of said group and occurring between said first position-indicating signal and an end of said train corresponding to an end of said group to produce a final count.

11. Measurement apparatus as defined in claim 10 and further comprising data recording means for recording data responsive to said final count.

12. Measurement apparatus as defined in claim 11 and wherein said counter means is digital, and said data recording means comprises digital-to-analog converter means responsive to the count of said counter means for producing an analog signal and further comprises analog data recording means for recording said final count.

13. Measurement apparatus as defined in claim 10 and further comprising automatic adjustment means responsive to the final count in said counter means for automatically adjusting the printing press.

14. Measurement apparatus as defined in claim 10 and further comprising means for reinitializing said counter means, said means for reinitializing including count initializing means for presetting a predetermined initial count and means for delaying the presetting following achievement of said final count, whereby said final count is retained temporarily in said counting means.

15. In a printing press having first and second rotatable members, apparatus for making measurements regarding the first member comprising first optical target means rotating with said first member and defining an angular sector thereof; first light means for illuminating said first target means; first optical sensor means for receiving reflected light signals within a stationary field of view through which said target rotates for producing gating signals indicative of the angular extent of said first optical target means; second optical target means comprising a group of transverse lines rotating with said second rotatable member and equally spaced apart angularly, said group extending less than 360° on said second member; second light means for illuminating said second target means; second optical sensor means for receiving light signals in a stationary field of view as said second optical target means revolves through said field of view to produce a train of successive signals, each signal of said train corresponding to a respective one of said lines; gating means enabled and disabled by said gating signals for respectively unblocking and blocking transmission of said train of successive signals to an output of said gating means; and counter means starting from an initialized state and responsive to unblocked signals of said train to count said unblocked signals, at least one of the first and last line signals of said group occurring during an unblocked interval of said gating means and the other of said first and last line signals occurring in a blocked interval of said gating means; whereby a final count of said counter means is responsive to the position of said first member with respect to said second member.

16. Measurement apparatus as defined in claim 15 and wherein said counter means comprises count presetting means actuatable to initialize said counter means prior to unblocking of said gating means.

17. Measurement apparatus as defined in claim 15 and further comprising means for reinitializing said counter means including means for delaying the reinitializing following achievement of said final count, whereby said final count is retained temporarily in said counter means.

18. Measurement apparatus as defined in claim 15 and further including means for indicating a malfunction including means responsive to spurious waveform signals arriving when said first target means should be producing a blocking signal, for producing the indication of malfunction.

19. Measurement apparatus as defined in claim 15 and further comprising data recording means for recording data responsive to said final count.

20. Measurement apparatus as defined in claim 15 and wherein said counter means is digital, and said data recording means comprises digital-to-analog converter means responsive to the count of said counter means for producing an analog signal and further comprises analog data recording means for recording said final count.

21. Measurement apparatus as defined in claim 15 and further comprising automatic adjustment means responsive to the final count in said counter means for automatically adjusting the printing press.

22. Measurement apparatus as defined in claim 15 and wherein said first and second rotatable members have a plurality of corresponding first and second target means and wherein said counter means comprises means for reinitializing said counter before a count corresponding to each target of said plurality is started.

* * * * *